(12) United States Patent
Gordon

(10) Patent No.: US 6,205,376 B1
(45) Date of Patent: Mar. 20, 2001

(54) BLOCKED PITOT-STATIC MONITOR

(75) Inventor: Thomas M. Gordon, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/337,993

(22) Filed: Jun. 22, 1999

(51) Int. Cl.$^7$ .................................................. G08B 23/00
(52) U.S. Cl. ............................ 701/4; 701/7; 701/8; 701/9
(58) Field of Search .................... 701/4, 7, 8, 9; 244/1 R, 82, 181; 73/186

(56) References Cited

U.S. PATENT DOCUMENTS

| | | | |
|---|---|---|---|
| 4,229,725 | * 10/1980 | Reilly | 340/968 |
| 5,349,347 | * 9/1994 | Muller | 340/969 |
| 5,938,147 | * 8/1999 | DoGroff | 244/1 R |
| 6,038,932 | * 3/2000 | Wandel et al. | 73/861 |
| 6,101,429 | * 8/2000 | Sarma et al. | 701/7 |

* cited by examiner

Primary Examiner—William A. Cuchlinski, Jr.
Assistant Examiner—Marthe Y. Marc-Coleman
(74) Attorney, Agent, or Firm—Nathan O. Jensen; Kyle Eppele; J. P. O'Shaughnessy

(57) ABSTRACT

Disclosed are avionics systems and methods of using the same to monitor a pitot-static system for blockages. A first aircraft movement rate is calculated as a function of a pressure sensed using the pitot-static system. A reference movement rate is calculated using an independent navigation system such as an inertial reference system, a global positioning system, or an attitude heading reference system. The calculated first aircraft movement rate is compared to the calculated reference movement rate to determine whether the calculated first aircraft movement rate falls within a predetermined tolerance range about the calculated reference movement rate. If the calculated first aircraft movement rate falls outside of the predetermined tolerance range about the calculated reference aircraft movement rate, it is determined that a blockage exists in at least one of a pitot tube or a static port of the pitot-static system.

19 Claims, 4 Drawing Sheets

BLOCKED PITOT-STATIC MONITOR

FIELD OF THE INVENTION

The present invention relates to aviation electronics (avionics). More particularly, the present invention relates to methods and apparatus for identifying blocked pitot tubes or static ports of the pitot-static system of an aircraft.

BACKGROUND OF THE INVENTION

Aircraft typically include pitot-static systems which are used to determine the longitudinal air speed and the altitude of the aircraft. The pitot system includes one or more pitot tubes which project out of the airframe, into the air stream, and allow the impact pressure of the atmosphere to enter the tube(s). Sensors sense a pressure differential to create an air speed indicative output. The pressure differential can be between the impact air pressure from the pitot tube and static air pressure from a static port. The air speed indicative output is provided, typically by an air data computer, to an air speed indicator in the cockpit.

The static system typically includes two or more of the static pressure ports which sense the atmospheric pressure outside of the aircraft, ideally without being influenced by pressure variances caused by movement of the aircraft. The standard atmospheric pressure sensed by the static ports is used to generate altitude indicative signals which are provided, typically by the air data computer, to an altimeter in the cockpit of the aircraft. Frequently, in newer aircraft, the static ports are integral to the pitot tubes.

The pitot tube(s) and static ports of a pitot-static system can sometimes develop blockages which seriously affect the accuracy of the sensed pressures, and therefore seriously affect the accuracy of the determined air speed and altitude. The pitot tubes and static ports can be blocked with foreign materials such as insects, birds, and ice, for example. In other instances, the static ports or pitot tube openings have been taped shut during maintenance of the aircraft, and accidentally left blocked. Erroneous air speed and altitude determinations made as a result of these blockages can create a dangerous operating situation for the aircraft.

SUMMARY OF THE INVENTION

Disclosed are avionics systems and methods of using the same to monitor a pitot-static system for blockages. A first aircraft movement rate is calculated as a function of a pressure sensed using the pitot-static system. A reference movement rate is calculated using an independent navigation system such as an inertial reference system, a global positioning system, or an attitude heading reference system. The calculated first aircraft movement rate is compared to the calculated reference movement rate to determine whether the calculated first aircraft movement rate falls within a predetermined tolerance range about the calculated reference movement rate. If the calculated first aircraft movement rate falls outside of the predetermined tolerance range about the calculated reference aircraft movement rate, it is determined that a blockage exists in at least one of a pitot tube or a static port of the pitot-static system.

DETAILED DESCRIPTION OF THE PREFERRED EMBODIMENTS

Figure 1:
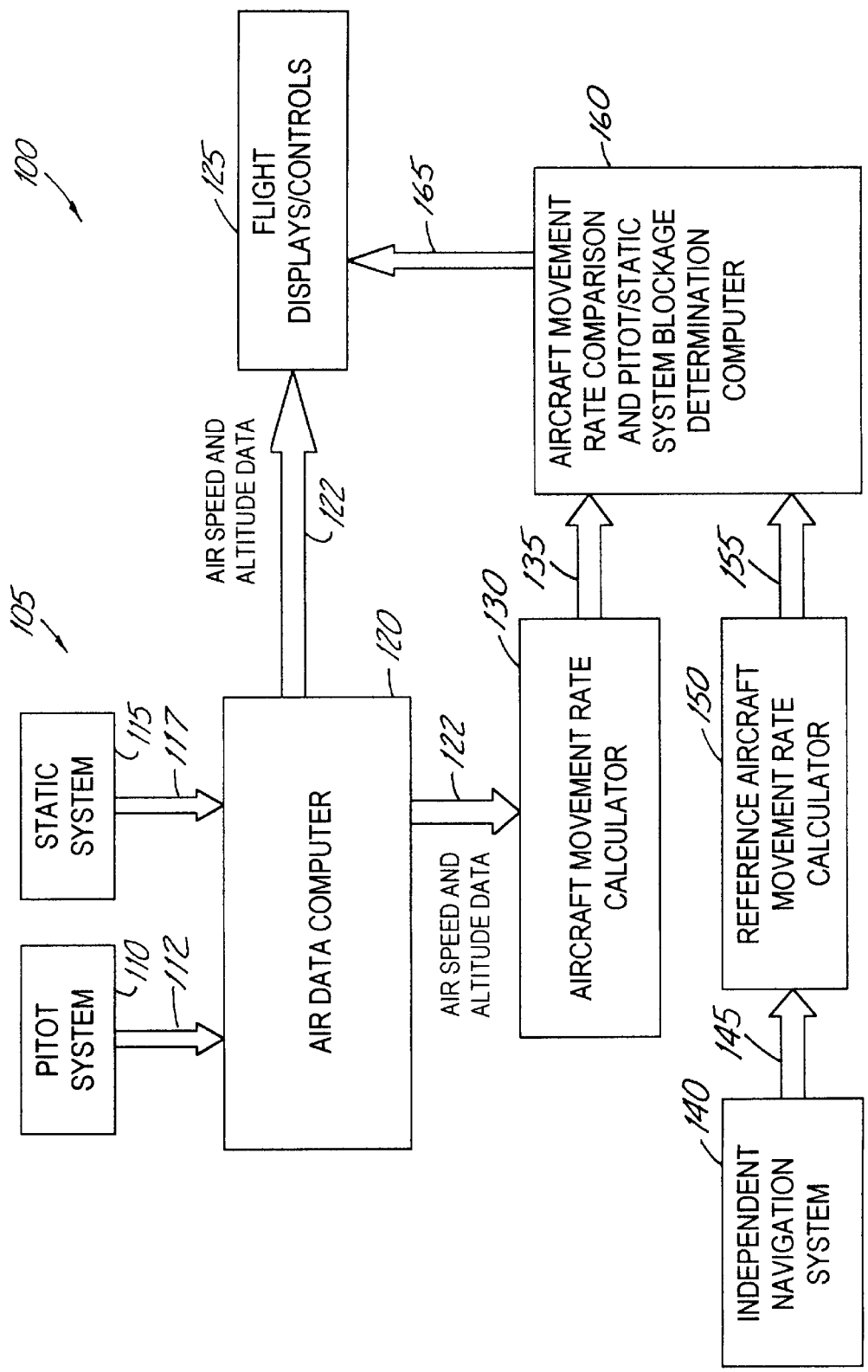
FIG. 1 is a block diagram illustrating a pitot-static monitor system in accordance with embodiments of the invention.

FIG. 1 is a block diagram of avionics system 100 adapted to provide pitot-static monitoring in accordance with the present invention. System 100 utilizes numerous conventional components of avionics systems, which are adapted to implement the methods of the present invention. System 100 includes pitot-static system 105, air data computer 120, flight displays/controls 125, aircraft movement rate calculator 130, independent navigation system 140, reference aircraft movement rate calculator 150 and aircraft movement rate comparison and pitot-static system blockage determination computer 160. Pitot-static system 105 includes a conventional pitot system 110 having one or more pitot tubes which can be blocked. Pitot system 110 provides output 112 to air data computer 120. Output 112 can be pressure, differential pressure, electrical signals or other types of output which are indicative of the pressure sensed by the pitot tube(s), and thereby indicative of the air speed of the aircraft in which system 100 is installed.

Static system 115 includes static pressure ports which sense the atmospheric pressure outside of the aircraft. Static system 115 provides output 117, to air data computer 120, which are indicative of the altitude of the aircraft. As with output 112 of pitot system 110, output 117 of static system 115 can include pressure, electrical signals, or other outputs indicative of the pressures sensed by static system 115 or of the altitude of the aircraft. While outputs 112 and 117 are illustrated as being provided to an air data computer, in other embodiments, these outputs are provided directly to altimeters and air speed indicators. In the embodiment illustrated, air data computer 120 provides air speed and altitude data 122 to flight displays/controls 125. Flight displays/controls 125 typically display to the pilot of the aircraft the altitude and air speed information. Also, flight displays/controls 125 can automatically control aspects of the aircraft operation based upon the air speed and altitude data 122.

Aircraft movement rate calculator 130, which can be a portion of air data computer 120 or an independent processor or calculation device, also receives air speed and altitude data 122 from air data computer 120. In the alternative, aircraft movement rate calculator 130 can receive the air speed and altitude data 122 directly from pitot system 110 and static system 115 in the form of signals 112 and 117. Aircraft movement rate calculator 130 uses the air speed and/or altitude data 122 to calculate an aircraft movement rate over a short time frame or window. As will be discussed below in greater detail, the aircraft movement rate calculated by calculator 130 can be a longitudinal speed of the aircraft, a longitudinal acceleration of the aircraft, a vertical speed of the aircraft, or a vertical acceleration of the aircraft. Aircraft movement rate calculator 130 provides the calculated aircraft movement rate to computer 160 in the form of aircraft movement rate data 135.

Independent navigation system 140 is an independent navigation system of the type typically included on aircraft for primary or backup navigation purposes. For example, independent navigation system 140 can include one or more of an inertial reference system (IRS), a global positioning system (GPS), and an attitude heading reference system (AHRS). Output 145 from independent navigation system 140 can be, for example, position information, air speed information, altitude information, or other data which can be used to generate an aircraft movement rate. Reference aircraft movement rate calculator 150 uses output 145 to generate the reference aircraft movement rate, and provides the reference aircraft movement rate to computer 160 via data output 155. As was the case with output 135, output 155 can represent, for example, a reference longitudinal speed of the aircraft, a reference longitudinal acceleration of the aircraft, a reference vertical speed of the aircraft or a reference vertical acceleration of the aircraft. While independent navigation system 140 can in some embodiments be used to supplement or enhance data from pitot-static system 105 in the generation of traditional air speed, altitude and other avionics information, navigation system 140 is essentially an "independent" navigation system. Being an independent navigation system, navigation system 140 can generate position, speed or acceleration information substantially without the use of pitot-static system 105.

Computer 160, which can also be a portion of air data computer 120 or a separate processor or computing device, compares the aircraft movement rate 135 generated by calculator 130 using pitot-static system information with the reference aircraft movement rate generated by calculator 150. Based upon the comparison, computer 160 determines whether a blockage exists in pitot-static system 105. Computer 160 then provides output 165 to flight displays/controls 125. Output 165, which is indicative of whether a blockage exists in pitot-static system 105, is used by flight displays/controls 125 to either visually or audibly warn the pilot of the blockage, and/or to control operation of the aircraft accordingly. By identifying blocked pitot tubes and/or static ports, the aircraft can be operated much more safely.

Figure 2:
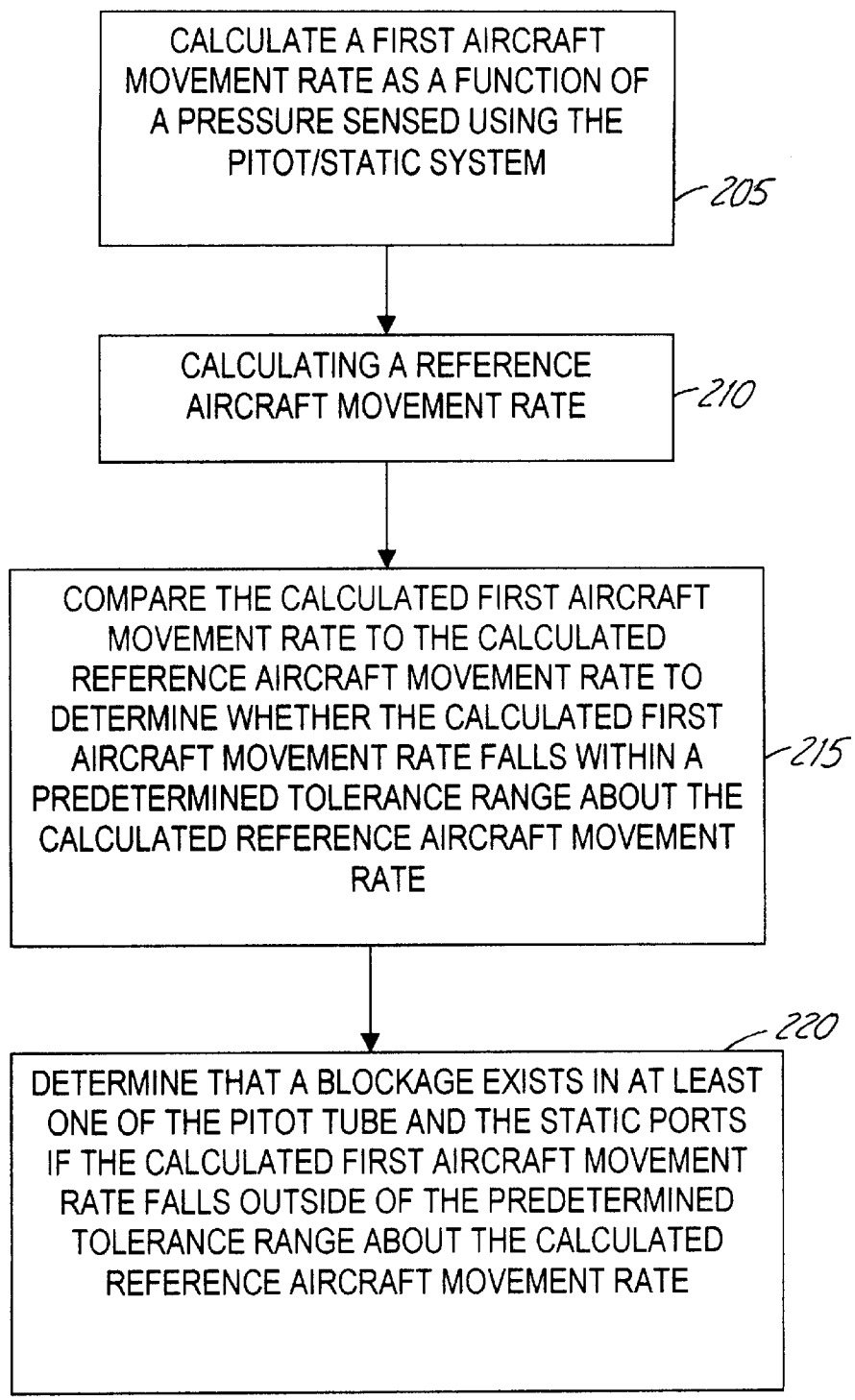
FIG. 2 is a flow diagram illustrating methods of the invention which can be implemented using the pitot-static monitor system shown in FIG. 1.

FIG. 2 is a block diagram illustrating a first method of monitoring a pitot-static avionics system for blockages in accordance with the present invention using a system such as the one described with reference to FIG. 1. As shown at block 205, a first aircraft movement rate is calculated as a function of pressure sensed using the pitot-static system. As shown at block 210, a reference aircraft movement rate is calculated. As shown at block 215, the calculated first aircraft movement rate is compared to the calculated reference aircraft movement rate to determine whether the calculated first aircraft movement rate falls within a predetermined tolerance range about the calculated reference aircraft movement rate. As shown at block 220, if the calculated first aircraft movement rate falls outside of the predetermined tolerance range about the calculated reference aircraft movement rate, it is determined that a blockage exists in at least one of the pitot tube(s) and/or the static ports.

As discussed above, in some embodiments of the invention, step 205 of calculating a first aircraft movement rate as a function of a pressure sensed using the pitot-static system includes calculating a first longitudinal speed of the aircraft as a function of the pressure sensed in the pitot tube(s). In these embodiments, step 220 of determining whether a blockage exists includes determining that a blockage exists in the pitot tube(s) if the calculated first longitudinal speed of the aircraft falls outside of the predetermined tolerance range around the calculated reference movement rate. In other embodiments, step 205 of calculating the first aircraft movement rate further includes calculating a first longitudinal acceleration of the aircraft as a function of the pressure sensed in the pitot tube(s). In these embodiments, step 220 of determining if a blockage exists includes determining that a blockage exists in the pitot tube(s) if the calculated first longitudinal acceleration of the aircraft falls outside of the predetermined tolerance range about the calculated reference movement rate.

In alternate embodiments of the invention, step 205 of calculating the first aircraft movement rate includes calculating a first vertical speed of the aircraft as a function of the pressure sensed in one or more static ports of pitot-static system 105. In these embodiments, step 220 of determining whether a blockage exists includes determining that a blockage exists in one or more the static ports if the calculated first vertical speed of the aircraft falls outside of the predetermined tolerance range around the calculated reference movement rate. In yet other alternate embodiments, step 205 of calculating the first aircraft movement rate includes calculating a first vertical acceleration of the aircraft as a function of the pressures sensed in the static ports. In these other alternate embodiments, step 220 of determining whether a blockage exists includes determining that a blockage exists in the static port if the calculated first vertical acceleration of the aircraft falls outside of the predetermined tolerance range about the calculated reference movement rate.

As discussed above, in embodiments of the method illustrated in FIG. 2, step 210 of calculating a reference aircraft movement rate includes the use of an independent navigation system 140 such as an IRS, a GPS, and/or an AHRS. Other types of independent navigation systems can be used as well. In general, step 210 involves using the independent navigation system to calculate a reference movement rate of the same type as the movement rate calculated using the pitot-static system.

Figure 3:
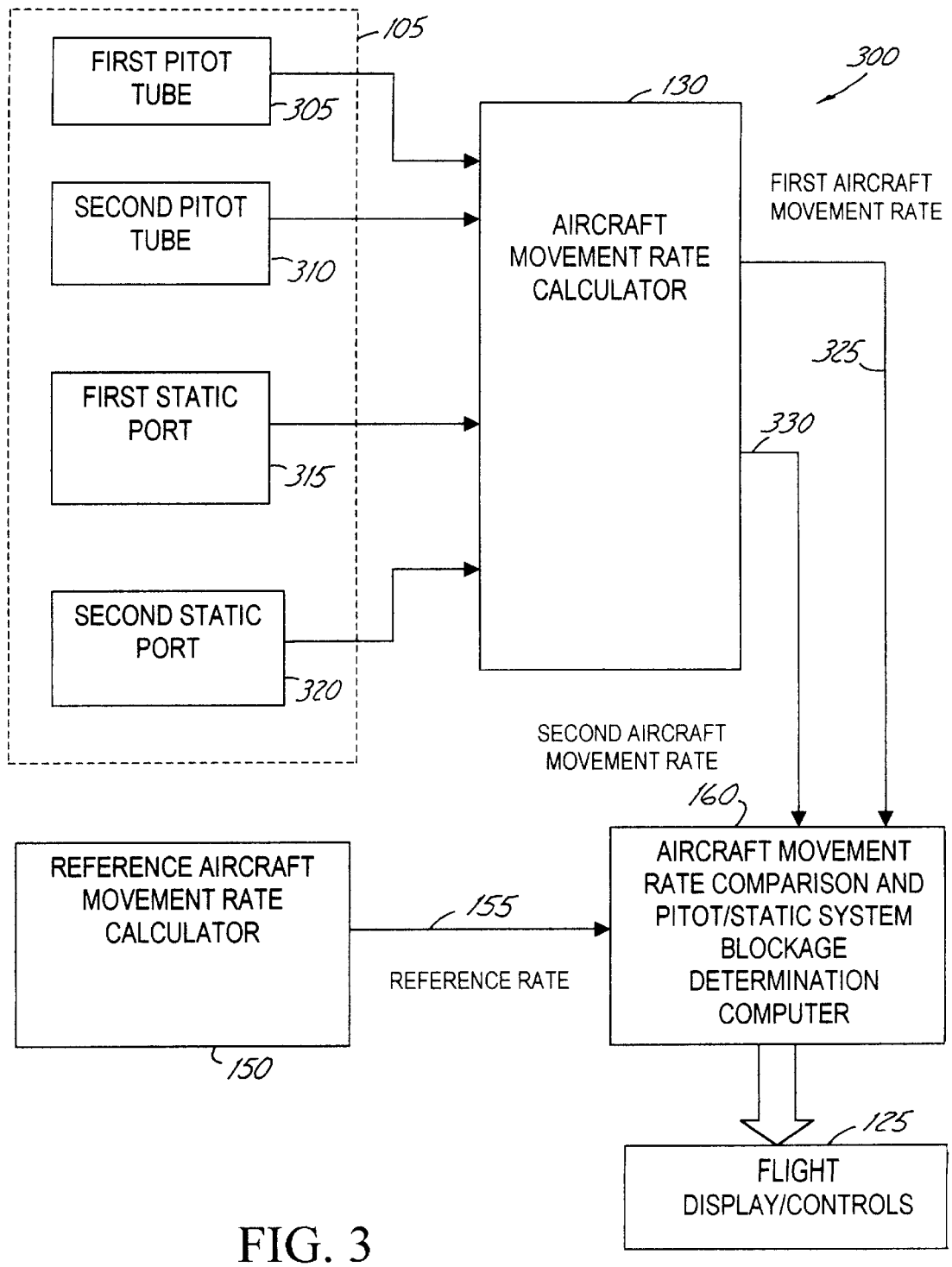
FIG. 3 is a block diagram of portions of a pitot-static monitor system in accordance with other embodiments of the invention.

FIG. 3 is a block diagram illustrating system 300 which is a portion of pitot-static monitor system 100 in accordance with some more particular embodiments of the invention. The illustrated portions of system 300 include pitot-static system 105, aircraft movement rate calculator 130, reference aircraft movement rate calculator 150, aircraft movement rate comparison and pitot-static system blockage determination computer 160 and flights displays/controls 125. Although not specifically illustrated in FIG. 3, other portions of system 100, such as independent navigation system 140, are also included in system 300.

In the embodiment of pitot-static system 105 illustrated in FIG. 3, the pitot-static system includes a first pitot tube 305, a second pitot tube 310, a first static port 315 and a second static port 320. Each of the pitot tubes and static ports senses pressures as described previously. In this more particular embodiment, aircraft movement rate calculator 130 generates two separate aircraft movement rates, first aircraft movement rate 325 and second aircraft movement rate 330. Typically, the first and second aircraft movement rates will be of a similar type. For example, if first aircraft movement rate 325 is calculated using a pressure sensed by first pitot tube 305, then second aircraft movement rate 330 will be generated using a pressure sensed by second pitot tube 310. Similarly, if first aircraft movement rate 325 is a vertical aircraft movement rate generated using a first pressure sensed using static port 315, then second aircraft movement rate 330 will be a vertical movement rate generated as a function of a pressure sensed by second static port 320.

As in previously described embodiments, reference aircraft movement rate calculator 150 generates a reference aircraft movement rate 155 using information from an independent navigation system 140 (not shown in FIG. 3).

Typically, the reference aircraft movement rate will be of the same type (i.e., longitudinal or vertical speed or acceleration) as first and second aircraft movement rates 325 and 330.

Aircraft movement rate comparison and pitot-static blockage determination computer 160 compares the first aircraft movement rate 325, the calculated second aircraft movement rate 330 and the calculated reference aircraft movement rate 155. Based upon the comparison, computer 160 determines both whether a blockage exists in the pitot-static system, and which one of the at least two pitot tubes and/or at least two static pressure ports are blocked based upon the comparison. While the embodiment illustrated in FIG. 3 includes at least two pitot tubes and at least two static ports, other embodiments can include only one pitot tube or only one static port. In these embodiments, it can be necessary to generate a second reference aircraft movement rate in order to compare three separate aircraft movement rates to determine whether a blockage exists in the pitot-static system.

Figure 4:
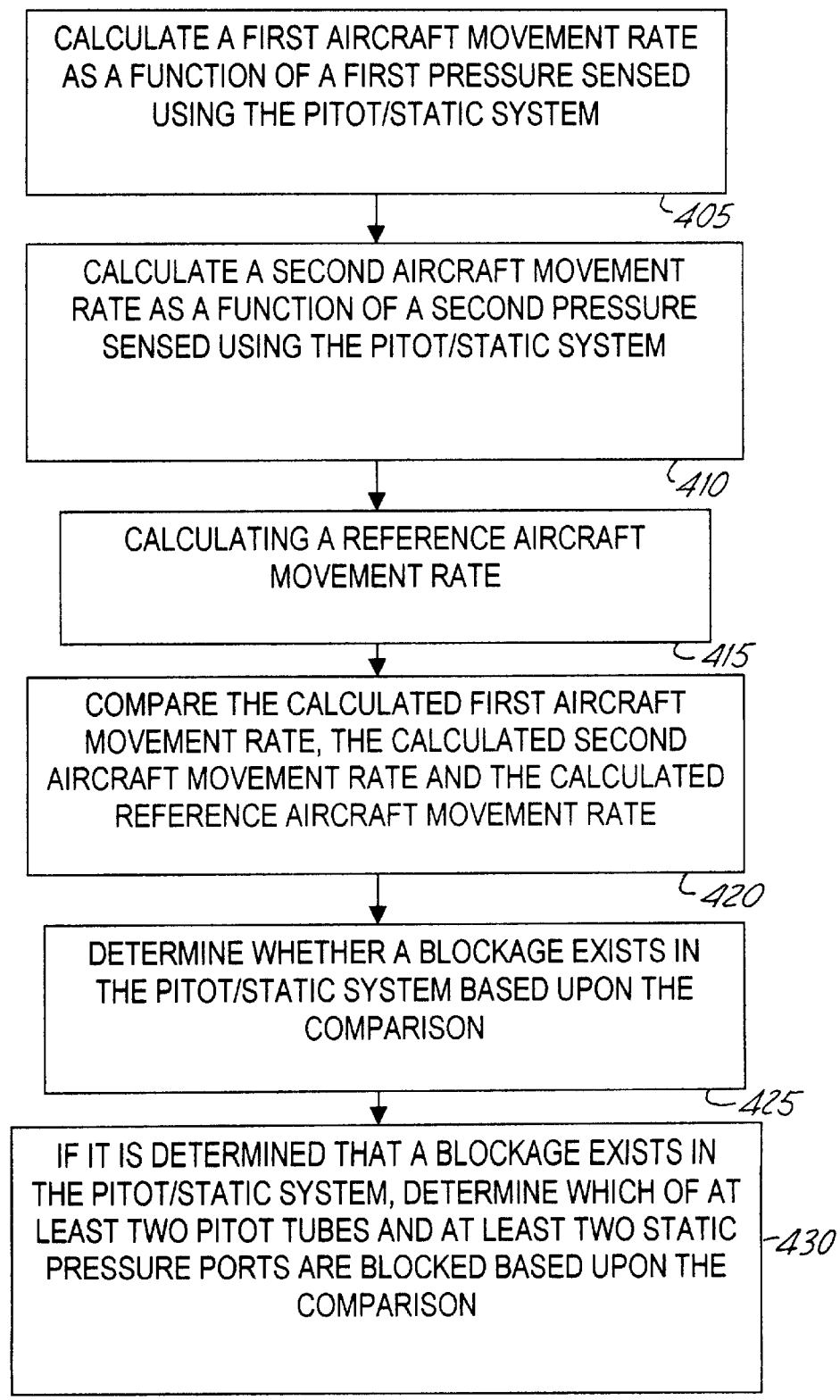
FIG. 4 is a flow diagram illustrating methods of the present invention which can be implemented using the pitot-static monitor system illustrated in FIG. 3.

FIG. 4 is a flow diagram illustrating methods of the present invention which can be implemented using the pitot-static monitoring system embodiment shown in FIG. 3. As shown at block 405, the method includes calculating a first aircraft movement rate as a function of a first pressure sensed using the pitot-static system. As shown at block 410, a second aircraft movement rate is calculated as a function of a second pressure sensed using the pitot-static system. As shown at block 415, a third aircraft movement rate, preferably a reference aircraft movement rate calculated using information from an independent navigation system, is calculated.

As shown at block 420, the calculated first aircraft movement rate, the calculated second aircraft movement rate and the calculated reference aircraft movement rate are compared. Based upon the comparison, a determination is made as to whether a blockage exists in the pitot-static system. This is illustrated at block 425 in FIG. 4. As illustrated at block 430, if it is determined that a blockage exists in the pitot-static system, a determination is made as to which of at least two pitot tubes and/or at least two static pressure ports are blocked based upon the comparison.

Generally, this decision includes determining whether two of the three compared aircraft movement rates are within a predetermined range of each other, while the third of the three compared aircraft movement rates is outside of the predetermined range from the other two aircraft movement rates. For example, if an aircraft movement rate determined as a function of pressure sensed with the first pitot tube 305 is close to the reference aircraft movement rate calculated as a function of the independent navigation system, but the second aircraft movement rate 330 calculated using a pressure sensed in second pitot tube 310 has a value which falls outside of a predetermined range about the first aircraft movement rate 325 and the reference aircraft movement rate 155, it can be determined that the second pitot tube 310 has a blockage. In contrast, if first and second aircraft movement rates 325 and 330 are generated using pressures sensed in first and second pitot tubes 305 and 310, and if these first and second aircraft movement rates fall within a predetermined range of each other while the reference aircraft movement rate does not, it can be determined that the reference aircraft movement rate has a substantial error and that no blockage exists.

Numerous embodiments of the methods illustrated in FIG. 4 are possible. In one embodiment, step 405 of calculating the first aircraft movement rate includes calculating a first longitudinal speed of the aircraft as a function of the first pressure, with the first pressure being sensed in first pitot tube 305. In these embodiments, step 410 of calculating the second aircraft movement rate includes calculating a second longitudinal speed of the aircraft as a function the second pressure, with the second pressure being sensed in the second pitot tube 310. In this embodiment, reference aircraft movement rate 155 would also be a longitudinal speed of the aircraft. In other embodiments, the first and second aircraft movement rates, generated as a function of pressures sensed in the first and second pitot tubes, are longitudinal accelerations of the aircraft. In these embodiments, reference aircraft movement rate 155 will be a longitudinal acceleration of the aircraft as well.

In still other embodiments of the method illustrated in FIG. 4, steps 405 and 410 of calculating the first and second aircraft movement rates include calculating a first vertical speed of the aircraft as a function of a pressure sensed in first static port 315, and calculating a second vertical speed of the aircraft as a function of a pressure sensed in second static port 320. In this embodiment, the reference aircraft movement rate will also be a vertical speed of the aircraft. In a similar alternate embodiment using first and second static ports 315 and 320, steps 405, 410 and 415 of the method illustrated in FIG. 4 include calculating vertical accelerations of the aircraft.

Although the present invention has been described with reference to preferred embodiments, workers skilled in the art will recognize that changes may be made in form and detail without departing from the spirit and scope of the invention.

What is claimed is:

1. A method of monitoring a pitot-static avionics system for blockages, the method comprising:

calculating a first aircraft movement rate as a function of a pressure sensed using the pitot-static system;

calculating a reference movement rate;

comparing the calculated first aircraft movement rate to the calculated reference movement rate to determine whether the calculated first aircraft movement rate falls within a predetermined tolerance range about the calculated reference movement rate; and determining that a blockage exists in at least one of a pitot tube and a static port if the calculated first aircraft movement rate falls outside of the predetermined tolerance range about the calculated reference aircraft movement rate.

2. The method of claim 1, wherein calculating the first aircraft movement rate includes calculating a first longitudinal speed of the aircraft as a function of the pressure sensed in the pitot tube, and wherein determining if a blockage exists includes determining that a blockage exists in the pitot tube if the calculated first longitudinal speed of the aircraft falls outside of the predetermined tolerance range about the calculated reference movement rate.

3. The method of claim 1, wherein calculating the first aircraft movement rate includes calculating a first longitudinal acceleration of the aircraft as a function of the pressure sensed in the pitot tube, and wherein determining if a blockage exists includes determining that a blockage exists in the pitot tube if the calculated first longitudinal acceleration of the aircraft falls outside of the predetermined tolerance range about the calculated reference movement rate.

4. The method of claim 1, wherein calculating the first aircraft movement rate includes calculating a first vertical speed of the aircraft as a function of the pressure sensed in the static port, and wherein determining if a blockage exists includes determining that a blockage exists in the static port if the calculated first vertical speed of the aircraft falls outside of the predetermined tolerance range about the calculated reference movement rate.

5. The method of claim 1, wherein calculating the first aircraft movement rate includes calculating a first vertical acceleration of the aircraft as a function of the pressure sensed in the static port, and wherein determining if a blockage exists includes determining that a blockage exists in the static port if the calculated first vertical acceleration of the aircraft falls outside of the predetermined tolerance range about the calculated reference movement rate.

6. The method of claim 1, wherein calculating the reference movement rate further includes calculating the reference movement rate over a window period of time using navigation information from at least one of an inertial reference system (IRS), a global positioning system (GPS), and an attitude heading reference system (AHRS).

7. A method of monitoring a pitot-static avionics system for blockages, the method comprising:
   calculating a first aircraft movement rate as a function of a first pressure sensed using the pitot-static system;
   calculating a second aircraft movement rate as a function of a second pressure sensed using the pitot-static system;
   calculating a reference aircraft movement rate;
   comparing the calculated first aircraft movement rate, the calculated second aircraft movement rate and the calculated reference aircraft movement rate; and
   determining whether a blockage exists in the pitot-static system based upon the comparison.

8. The method of claim 7, and further comprising determining which one of at least two pitot tubes and at least two static pressure ports are blocked based upon the comparison.

9. The method of claim 8, wherein calculating the first aircraft movement rate includes calculating a first longitudinal speed of the aircraft as a function of the first pressure, the first pressure being sensed in a first pitot tube, and wherein calculating the second aircraft movement rate includes calculating a second longitudinal speed of the aircraft as a function of the second pressure, the second pressure being sensed in a second pitot tube.

10. The method of claim 8, wherein calculating the first aircraft movement rate includes calculating a first longitudinal acceleration of the aircraft as a function of the first pressure, the first pressure being sensed in a first pitot tube, and wherein calculating the second aircraft movement rate includes calculating a second longitudinal acceleration of the aircraft as a function of the second pressure, the second pressure being sensed in a second pitot tube.

11. The method of claim 8, wherein calculating the first aircraft movement rate includes calculating a first vertical speed of the aircraft as a function of the first pressure, the first pressure being sensed in a first static port, and wherein calculating the second aircraft movement rate includes calculating a second vertical speed of the aircraft as a function of the second pressure, the second pressure being sensed in a second static port.

12. The method of claim 8, wherein calculating the first aircraft movement rate includes calculating a first vertical acceleration of the aircraft as a function of the first pressure, the first pressure being sensed in a first static port, and wherein calculating the second aircraft movement rate includes calculating a second vertical acceleration of the aircraft as a function of the second pressure, the second pressure being sensed in a second static port.

13. The method of claim 7, wherein calculating the reference aircraft movement rate further includes calculating the reference movement rate over a window period of time using navigation information from at least one of an inertial reference system (IRS), a global positioning system (GPS), and an attitude heading reference system (AHRS).

14. An avionics system comprising:
   a pitot-static system including at least one pitot tube and at least one static port, the pitot-static system providing an output indicative of a pressure sensed by the pitot-static system;
   a first aircraft movement rate calculator coupled to the pitot-static system and adapted to calculate a first aircraft movement rate as a function of the pressure sensed by the pitot-static system;
   a navigation system providing a navigation system output;
   an aircraft reference movement rate calculator coupled to the navigation system and adapted to calculate a reference movement rate of the aircraft as a function of the navigation system output;
   comparison circuitry adapted to compare the calculated first aircraft movement rate to the calculated reference movement rate; and
   pitot-static blockage determination circuitry coupled to the comparison circuitry and adapted to determine whether a blockage exists in at least one of a pitot tube and a static port as a function of the comparison.

15. The avionics system of claim 14, wherein the navigation system includes at least one of an inertial reference system (IRS), a global positioning system (GPS), and an attitude heading reference system (AHRS).

16. The avionics system of claim 14, wherein the first aircraft movement rate calculator is adapted to calculate as the first aircraft movement rate a first longitudinal speed of the aircraft.

17. The avionics system of claim 14, wherein the first aircraft movement rate calculator is adapted to calculate as the first aircraft movement rate a first longitudinal acceleration of the aircraft.

18. The avionics system of claim 14, wherein the first aircraft movement rate calculator is adapted to calculate as the first aircraft movement rate a first vertical speed of the aircraft.

19. The avionics system of claim 14, wherein the first aircraft movement rate calculator is adapted to calculate as the first aircraft movement rate a first vertical acceleration of the aircraft.

* * * * *